United States Patent
Kubota et al.

(10) Patent No.: US 12,286,608 B2
(45) Date of Patent: Apr. 29, 2025

(54) BEER-TASTE FERMENTED MALT BEVERAGE

(71) Applicant: Asahi Group Holdings, Ltd., Tokyo (JP)

(72) Inventors: Jun Kubota, Tokyo (JP); Syotaro Maekawa, Tokyo (JP)

(73) Assignee: ASAHI GROUP HOLDINGS, LTD., Tokyo (JP)

( * ) Notice: Subject to any disclaimer, the term of this patent is extended or adjusted under 35 U.S.C. 154(b) by 27 days.

(21) Appl. No.: 17/613,260

(22) PCT Filed: Jan. 27, 2021

(86) PCT No.: PCT/JP2021/002868
§ 371 (c)(1),
(2) Date: Nov. 22, 2021

(87) PCT Pub. No.: WO2021/153625
PCT Pub. Date: Aug. 5, 2021

(65) Prior Publication Data
US 2022/0220426 A1     Jul. 14, 2022

(30) Foreign Application Priority Data
Jan. 28, 2020   (JP) ................. 2020-011736

(51) Int. Cl.
*C12C 12/04*   (2006.01)
*C12C 11/00*   (2006.01)

(52) U.S. Cl.
CPC ........... *C12C 12/04* (2013.01); *C12C 11/003* (2013.01)

(58) Field of Classification Search
CPC ........... C12H 3/00; C12C 12/04; A23L 11/60
See application file for complete search history.

(56) References Cited

U.S. PATENT DOCUMENTS

2012/0021116 A1   1/2012   Itakura et al.

FOREIGN PATENT DOCUMENTS

| EP | 3 957 185 | 2/2022 |
|---|---|---|
| JP | 2003-250503 | 9/2003 |
| JP | 5855579 | 2/2016 |
| JP | 2016-144412 | 8/2016 |
| JP | 2017-143742 | 8/2017 |

(Continued)

OTHER PUBLICATIONS

De Keukeleire, D., "Fundamentals of Beer and Hop Chemistry", Química Nova, 23(1), (2000), pp. 108-112. (Year: 2000).*

(Continued)

*Primary Examiner* — Elizabeth Gwartney
(74) *Attorney, Agent, or Firm* — Wenderoth, Lind & Ponack, L.L.P.

(57) ABSTRACT

An object of the invention is to provide a beer-taste fermented malt beverage with an alcohol concentration of less than 1% (v/v), which has beer-like fermented feeling and robust feeling of drinking, and does not give a watery drinking feeling. The means for solving the problems is a beer-taste fermented malt beverage with an alcohol concentration of less than 1% (v/v), containing a wort fermented liquid, more than 5.3 ppm and less than 80 ppm of pyruvic acid, more than 29.2 ppm and less than 90 ppm of succinic acid, and having a genuine extract concentration of more than 2.0% (w/w).

13 Claims, 1 Drawing Sheet

(56) References Cited

FOREIGN PATENT DOCUMENTS

| WO | 2012/077212 | 6/2012 |
| WO | 2013/041496 | 3/2013 |
| WO | 2019/138631 | 7/2019 |

OTHER PUBLICATIONS

Furukawa et al., JP 2016144412 A—Espacenet English translation (Year: 2016).*
International Preliminary Report on Patentability and Written Opinion of the International Searching Authority issued Jul. 28, 2022 in International (PCT) Application No. PCT/JP2021/002868, together with English translations thereof.
International Search Report (ISR) issued Mar. 30, 2021 in International (PCT) Application No. PCT/JP2021/002868.
China Academic Journal Electronic Publishing House, "Succinic Acid in Beer", 2005, vol. 7, pp. 17-20, with English Abstract, 4 pages.
Office Action issued May 17, 2023, in New Zealand Patent Application No. 782275.
Tyrell T. et al., "Screening of Brewery Yeast Strains Regarding Organic Acid Profile in Order to Find Low Succinic Acid Producer", BrewingScience, 2013, vol. 66, No. 7, pp. 75-84.
Office Action issued Oct. 26, 2023 in corresponding Russian Patent Application No. 2021136034, with English language translation, 14 pages.
Selina et al., "Nitrogen Substances and Carbohydrates Influence on Beer Quality", Collection of works "Current issues of the industry drinks", VNIIPBiVP, 2018, No. 2, pp. 149-154, 6 pages.
Communication pursuant to Rule 114(2) EPC issued May 22, 2024 in European Patent Application No. 21747834.6, 5 pages.
Mota et al., "Formation of Flavor-Active Compounds During Continuous Alcohol-free Beer Production: The Influence of Yeast Strain, Reactor Configuration, and Carrier Type", J. Am. Soc. Brew. Chem., 2011, vol. 69, No. 1, pp. 1-7, 8 pages.
Brewer's Friend. Beer Styles IBU Chart—2017 Update. Obtained from: https://www.brewersfriend.com/2017/05/07/beer-styles-ibu-chart-2017-update/, Accessed Mar. 5, 2024, 1 page.
Official Communication of Third Party Observations issued Apr. 15, 2024 in corresponding European Patent Application No. 21747834.6.
Coote et al., "The content of some organic acids in beer and other fermented media", J. Inst. Brew., vol. 80, 1974, 474-483.
Office Action issued Apr. 15, 2024 in corresponding Singapore Patent Application No. 11202112775W, 8 pages.
"Malt extract kwas", 2005, pp. 17-20, with English translation, 12 pages.
Yang et al., "Succinic acid in beer", China Academic Journal of Electronic Publishing House, 2004, pp. 390-395, with English translation 12 pages.
Office Action issued Sep. 20, 2024 in European Patent Application No. 21 747 834.6.
Communication providing Third Party Observations dated Oct. 15, 2024 in European Patent Application No. 21747834.6.
Office Action issued Jun. 26, 2023 in corresponding European Patent Application No. 21747834.6, 8 pages.
Official Communications of Third Party Observations dated Mar. 7, 2025 in corresponding European Patent Application No. 21747834.6, pp. 1-8.
Montanari, Luigi et al., "Production of Alcohol-Free Beer", Beer in Health and Disease Prevention, 2009, pp. 61-75.

* cited by examiner

BEER-TASTE FERMENTED MALT BEVERAGE

CROSS-REFERENCE TO RELATED APPLICATION

This application claims benefit under Article 4 of the Paris Convention base on Japanese Patent Application No. 2020-011736 filed in Japan on Jan. 28, 2020, incorporated herein by reference in their entirety.

TECHNICAL FIELD

The present invention relates to a beer-taste fermented malt beverage, and particularly to a beer-taste fermented malt beverage with an alcohol concentration of less than 1% (v/v). As used herein, the term "alcohol" means ethanol.

"Fermented malt beverage" means a beverage obtained through the process of using malt as a raw material, and fermenting the same. "Beer taste" means a taste and aroma reminiscent of beer. "Beer" means a beverage obtained through the use of fermenting malt, hops, water and the like as raw materials, and fermenting these with yeast.

BACKGROUND ART

Low-alcohol beer made by removing alcohol from ordinary beer is known. For example, Patent Document 1 describes a beer-taste beverage obtained by subjecting a beer after fermentation to an alcohol-removing treatment to remove When the alcohol component is removed from beer, that is a fermented product of wort, flavor components produced in an alcoholic fermentation process may be left, and the obtained beer-taste fermented malt beverage has beer-like fermented feeling. Also, low molecular saccharides are consumed in the fermentation process, and the above beer-taste fermented malt beverage hardly feels unpleasant sticky aftertaste. In addition, high molecular weight saccharides remain even after the fermentation process, and the beer-taste fermented malt beverage imparts a feeling of touchiness or catchiness felt in the throat when swallowing, that is, robust feeling of drinking.

On the other hand, the beer-taste beverage from which the alcohol component has been removed does not feel stimulation coming from the alcohol component when drinking. In particular, beer that has undergone the fermentation process is low in concentration of low molecular saccharides, and the intensity of its sweetness and richness are reduced. Due to that effects, a low-alcohol beer-taste beverage, obtained from beer as a raw material by removing alcohol, has a problem of imparting watery drinking feeling. Watery means a weak taste that feels much in water content.

Patent Document 2 describes that a sour agent such as pyruvic acid is included in a beer-taste beverage with an alcohol concentration of less than 0.005% (v/v), and, thereby, beer-like sharp aftertaste is realized, while robust feeling of drinking is provided. In Patent Document 2, the beer-taste beverage to which a sour agent such as pyruvic acid is added is specifically a liquid obtained by diluting wort using a beer-flavored flavoring, caramel coloring, and carbonated water so that the extract component is 2.0% (Examples 1 to 4). This beer-taste beverage has not undergone a fermentation process and contains low-molecular saccharides derived from wort. Therefore, the beer-taste beverage has sweetness and richness from low-molecular saccharides, and does not impart watery drinking feeling.

PRIOR ART DOCUMENTS

Patent Documents

Patent Document 1: JP 2003-250503 A
Patent Document 2: JP 2016-144412 A

SUMMARY OF THE INVENTION

Problems to be Solved by the Invention

The present invention solves the above problems, and an object thereof is to provide a beer-taste fermented malt beverage with an alcohol concentration of less than 1% (v/v) (hereinafter may referred to as a "low-alcohol beer-taste fermented malt beverage"), which has beer-like fermented feeling and robust feeling of drinking, and does not impart watery drinking feeling.

Means for Solving the Problems

The present invention provides a beer-taste fermented malt beverage with an alcohol concentration of less than 1% (v/v), containing a wort fermented liquid, more than 5.3 ppm and less than 80 ppm of pyruvic acid, more than 29.2 ppm and less than 90 ppm of succinic acid, and having a genuine extract concentration of more than 2.0% (w/w).

In one embodiment, the concentration of the pyruvic acid is 20 to 75 ppm.

In one embodiment, the concentration of the succinic acid is 35 to 85 ppm.

In one embodiment, the wort fermented liquid is an alcohol-removed wort fermented liquid.

In one embodiment, the wort fermented liquid is a wort bottom fermented liquid.

In one embodiment, the wort fermented liquid has an apparent final degree of fermentation of 80% or less.

In one embodiment, the beer-taste fermented malt beverage has a malt use ratio of 25% or more.

In one embodiment, the beer-taste fermented malt beverage has a genuine extract concentration of more than 2.0% (w/w).

Also, the present invention provides a method for producing a beer-taste fermented malt beverage with an alcohol concentration of less than 1% (v/v), containing more than 5.3 ppm and less than 80 ppm of pyruvic acid, more than 29.2 ppm and less than 90 ppm of succinic acid, and having a genuine extract concentration of more than 2.0% (w/w), the method comprising:
  a step of obtaining a wort fermented liquid; and
  a step of reducing the alcohol concentration to less than 1% (v/v) by removing alcohol from the wort fermented liquid.

Effect of the Invention

According to the present invention, a low-alcohol beer-taste fermented malt beverage, that has beer-like fermented feeling and robust feeling of drinking, does not impart watery drinking feeling, yet has excellent refreshing feeling, is provided. As a result, the low-alcohol beer-taste fermented malt beverage of the present invention has excellent palatability.

DESCRIPTION OF EMBODIMENTS

The beer-taste fermented malt beverage of the present invention may be produced according to a method for producing a beer-taste fermented malt beverage with an alcohol concentration of less than 1% (v/v) through a process of fermenting wort, wherein the predetermined concentrations of pyruvic acid and succinic acid are allowed to generate, for example, by adjusting fermentation conditions. An example of the method for producing a low-alcohol beer-taste fermented malt beverage will be described below.

By first, crushed malt, auxiliary raw materials such as barley, and warm water are placed into a preparation tank and mixed to prepare maische. The preparation of the maische can be performed by a conventional method. For example, first, by holding at 35 to 60° C. for 20 to 90 minutes, proteins derived from raw materials is decomposed into amino acids and the like, and then, a saccharifying step is conducted. At this stage, as necessary, an enzyme such as transglucosidase, and flavor components such as spices and herbs, and the like may be added other than the main raw materials and the auxiliary raw materials.

Then, by gradually raising the temperature of the maische and holding it at a predetermined temperature for a certain period of time, starchy component is saccharified by utilizing an enzyme derived from malt and an enzyme added to the maische. The temperature and time during the saccharifying treatment may be appropriately determined in consideration of the type of enzyme used, the amount of maische, the quality of the intended wort fermented liquid, and the like, which may be carried out by holding, for example, from 60 at 72° C. for 30 to 90 minutes. After the saccharifying treatment, the maische is held at 76 to 78° C. for about 10 minutes, and then filtered in a wort filtration tank to obtain a transparent saccharide liquid. Further, when performing the saccharifying treatment, an appropriate amount of the enzyme may be added within a necessary range.

The wort fermented liquid is a liquid obtained by fermenting wort. The wort fermented liquid may be a wort top fermented liquid or a wort bottom fermented liquid. The wort top fermented liquid means a wort fermented liquid prepared by inoculating top fermenting yeast to wort, and fermenting under normal fermentation conditions, for example, at 15 to 25° C. for several days. The wort bottom fermented liquid means a wort fermented liquid prepared by inoculating bottom fermenting yeast to wort, and fermenting under normal fermentation conditions, for example, at around 10° C. for about one week.

Raw materials to be saccharified contain malt. The content of malt in raw materials to be saccharified is not particularly limited, but is 25% or more, preferably 50% or more, and more preferably 67% or more. The malt use ratio is a ratio (% by weight) of malt to all raw materials excluding water. The raw materials to be saccharified may be 100% malt. In general, the higher the malt use ratio, the stronger the malt-derived umami, richness and robust feeling of drinking of the obtained wort.

Auxiliary raw materials mean raw materials other than malt and hops. Examples of the auxiliary raw materials are starchy raw materials such as barley, wheat, corn starch, corn grits, rice, and Kaoliang, and saccharide raw materials such as liquid sugar and sugar. Here, the liquid sugar is produced by decomposing and saccharifying starchy component with an acid or a saccharifying enzyme, and mainly contains glucose, maltose, maltotriose and the like. In addition, spices, herbs, fruits and the like used for the purpose of imparting or improving flavor are also included in the auxiliary raw materials.

The saccharifying enzyme means an enzyme for decomposing starchy component into saccharide. As the saccharifying enzyme, there are, for example, α-amylase, glucoamylase, pullanase and the like.

Wort boiling operation may be carried out according to the method and conditions which are commonly carried out when producing beer. For example, a saccharide liquid, the pH of which has been adjusted, is transferred to a boiling kettle, and boiled. During the time from the start of boiling of the saccharide liquid until being left to stand, hops are added in a whirlpool. Hop extract or a component extracted from hops may be used as the hops. The saccharide liquid is then transferred to a precipitation tank called a whirlpool. After hop lees and curdled protein, produced by boiling, are removed, the resulting liquid is cooled to an appropriate fermentation temperature by a plate cooler. Wort is obtained by the above wort boiling operation.

The resulting wort is fermented with yeast. As the yeast to be used, top-fermenting yeast may be used, or bottom-fermenting yeast may be used, but it is preferred to use bottom-fermenting yeast from the viewpoint of controlling sourness, astringency and the like. The type of yeast and fermentation conditions are adjusted to conditions under which predetermined concentrations of pyruvic acid and succinic acid are produced in the beer-taste fermented malt beverage. The types of such yeasts and fermentation conditions are known. For example, WO2012/077212 A1 describes a method of increasing or decreasing produced amounts of pyruvic acid and succinic acid in a fermentation process for producing a beer-like fermented beverage. N. Coote et al "The Concentration and Significance Pyruvate in Beer", J. Inst. Brew., Vol. 79, 1973, p298-304 describes the results of studies on the factors that control the pyruvic acid content in beer. JP H10-117760 A describes a method of adjusting produced amounts of malic acid and succinic acid in a fermentation process for producing low-malt beer. As a method other than adjusting the fermentation conditions, pyruvic acid and succinic acid may be added to the wort before, during or after fermentation, or the fermented liquid may be diluted so that the concentrations of pyruvic acid and succinic acid in the beer-taste fermented malt beverage are adjusted in predetermined ranges.

The beer-taste fermented malt beverage of the present invention contains pyruvic acid at a concentration of more than 5.3 ppm and less than 80 ppm. By adjusting the pyruvic acid concentration to the above range, the sourness of the beer-taste fermented malt beverage does not stand out, the watery drinking feeling is reduced, and the refreshing feeling is enhanced. The pyruvic acid concentration is preferably 20 to 75 ppm, and more preferably 25 to 70 ppm.

The beer-taste fermented malt beverage of the present invention contains succinic acid at a concentration of more than 29.2 ppm and less than 90 ppm. By adjusting the succinic acid concentration within the above range, the sourness of the beer-taste fermented malt beverage does not stand out, the watery drinking feeling is reduced, and the refreshing feeling is enhanced. The succinic acid concentration is preferably 20 to 200 ppm, and more preferably 35 to 85 ppm.

The apparent final degree of fermentation of the wort fermented liquid is preferably 80% or less. When the apparent final degree of fermentation of the wort fermented liquid exceeds 80%, the robust feeling of drinking of the obtained beer-taste beverage tends to be insufficient, and the sourness tends to be strong. The apparent final degree of fermentation of the fermented wort liquid of the present invention is preferably 45 to 80%, and more preferably 50 to 75%.

The degree of fermentation is an important index which indicates to what extent fermentation has progressed in beer after fermentation, i.e., the progress of fermentation. Further, the final degree of fermentation means the ratio of the extract component that can be assimilated by beer yeast based on the raw wort extract component. Here, the extract component that can be assimilated by beer yeast is what is obtained by subtracting an extract component contained in the produced beer (that is, an extract component remaining after fermenting all the extract components that can be used by beer yeast (referred to as a final extract component)) from the raw wort extract component. The apparent final degree of fermentation means the final degree of fermentation which is calculated by using, as the value of final extract component, the apparent extract component, that is, the extract concentration (% (w/w)) derived from the specific gravity of alcohol-containing beer.

The extract means the concentration (%(w/w)) of a non-volatile solid component. The genuine extract concentration of the wort fermented liquid may be measured by, for example, the EBC method (BCOJ Beer Analysis Method, 7.2 (2004), edited by the Beer Brewery Association). The term extract means the non-volatile solid component itself, the amount of the non-volatile solid component, or the concentration of the non-volatile solid component depending on the context.

The apparent final degree of fermentation $V_{end}$ of the wort fermented liquid may be obtained by, for example, the following formula (1).

$$V_{end}(\%) = \{(P - E_{end})/P\} \times 100 \tag{1}$$

wherein P is a raw wort extract component and $E_{end}$ is an apparent final extract component.

The raw wort extract component P is the theoretical wort extract component value before alcoholic fermentation, which is back calculated from the alcohol concentration and the extract component value of the produced beer according to Balling's formula. Specifically, it may be obtained by the method shown in Analytica-EBC (9.4) (2007). In addition, the apparent final extract component $E_{end}$ may be determined by collecting beer in a flask, adding a large amount of fresh pressed yeast, fermenting the mixture at 25° C. while stirring until the extract component value does not decrease any more (24 hours), and measuring the apparent extract component value in the remaining beer.

The apparent final extract component $E_{end}$ may show a negative value because it is calculated from the alcohol-containing specific gravity of the final extract component. As a result, the apparent final degree of fermentation may exceed 100%.

The apparent final degree of fermentation may be controlled by adjusting, for example, the saccharifying conditions, whether or not the enzyme is used when saccharifying the raw material, the type and blending amount of the raw material, and the like. For example, the apparent final degree of fermentation may be reduced by reducing the amount of assimilable saccharides contained in maische.

After completion of the fermentation, furthermore, the obtained wort fermented liquid is matured as a maturing process in a liquor storage tank, stored under a low temperature condition of about 0° C., and stabilized. Next, as a filtration step, yeast, proteins and the like are removed by filtering the wort fermented liquid after maturation.

From the wort fermented liquid, from which yeast, protein and the like have been removed, carbon dioxide gas contained therein is removed as necessary. In addition, the wort fermented liquid is subjected to an alcohol-removing step to remove alcohol contained therein. The alcohol-removing step is carried out until the alcohol concentration of the wort fermented liquid is, for example, less than 1% (v/v), preferably less than 0.5% (v/v), and more preferably less than 0.1% (v/v). The alcohol-removing step is carried out using a conventionally known method. For example, a vacuum distillation method may be used. In this case, it is preferred to employ a method in which flavor components produced in the alcoholic fermentation process are allowed to remain therein.

A pH adjusting agent is added to the alcohol-removed wort fermented liquid to lower the pH as necessary. By sufficiently lowering the pH, bacteriostatic properties required for marketing the beverage is imparted, and the beer-taste fermented malt beverage of the present invention is obtained. The beer-taste fermented malt beverage of the present invention may have a low pH to such an extent that the spoilage prevention effect is obtained. The specific upper limit of the pH is less than 4.2, preferably less than 4.1, and more preferably less than 4.0. On the other hand, the specific lower limit of the pH is 3.0 or more, preferably 3.3 or more, and more preferably 3.6 or more.

The types of pH adjusting agents are not limited. Acids, which are food additives and which may be used for beverages, foods or production process thereof, salts thereof, and beer raw materials having pH lowering ability, may be used as pH adjusting agents. Examples of the beer raw materials having a pH lowering ability include sour malt, dark malt and the like. Preferred pH adjusting agents are phytic acid, citric acid, lactic acid, lactic acid bacteria, phosphoric acid, malic acid, sulfurous anhydride, tartaric acid, gluconic acid, acetic acid, succinic acid, adipic acid, itaconic acid, fumaric acid and combinations thereof. More preferred pH adjustors are phytic acid, lactic acid, lactic acid bacteria, phosphoric acid, malic acid, sulfurous anhydride, tartaric acid and combinations thereof. Considering the effect on the flavor of beer-taste beverages, phytic acid, which has less sourness among these, is most preferred.

To the alcohol-removed wort fermented liquid, a bitter substance is added as necessary to adjust the bitterness value. Isolated iso-α acids may be used as the bitter substance. The iso-α acids are contained in hops, and it may also be employed as hops or a hop extract. The hops or hop extract means hop leaves, a ground product thereof, an extraction liquid obtained by extracting these with water or boiling water, a concentrate and a dried product of the extraction liquid.

The bitterness value of beer-taste beverages is adjusted to have a bitterness equivalent to beer. Specifically, the bitterness value of the beer-taste beverage is adjusted to 5 to 100 BU, preferably 10 to 35 BU, and more preferably 15 to 27 BU. The bitterness value of beer-taste beverages may be measured by the EBC method described in BCOJ Beer Analysis Method, 8.15 (2004), edited by the Beer Brewery Association.

To the alcohol-removed wort fermented liquid, carbon dioxide gas is added through a carbonation step. This results in obtaining the beer-taste fermented malt beverage of the present invention. The amount of carbon dioxide gas added is adjusted so that it has the same foaming property as beer. Specifically, the amount of carbon dioxide gas added is adjusted so as to be 1.2 to 5.0 gas volumes, preferably 2.4 to 3.5 gas volumes, and more preferably 2.6 to 3.2 gas volumes.

The beer-taste fermented malt beverage of the present invention has a genuine extract concentration of more than 2.0% (w/w) due to the extract component derived from the wort fermented liquid. As a result, the watery drinking feeling of the beer-taste fermented malt beverage is reduced, and the robust feeling of drinking is easily enhanced. The genuine extract concentration due to the extract component derived from the wort fermented liquid of the beer-taste fermented malt beverage is preferably 2.5 to 6.0% (w/w), and more preferably 3.0 to 5.0% (w/w).

The present invention will be described in more detail with reference to the following examples, but the present invention is not limited these.

EXAMPLES

Example 1

[Production Method of Beer-Taste Fermented Malt Beverage]

Crushed malt, water, and corn starch were put in a preparation kettle, gelatinized at 70° C., and liquefied at 100° C. Next, crushed malt, an enzyme and warm water were put in a preparation tank, protein was decomposed at around 55° C., and then the liquid was transferred from the preparation kettle to the preparation tank, and saccharifying was performed at a temperature in the range of 60° C. to 76° C. This saccharified liquid was filtered with a lauter that was a filter tank, then transferred to a boiling kettle, bitter hops were added, and boiled for 60 minutes. After boiling, warm water equivalent to the evaporated component was added, hot trub was removed in a whirlpool tank, followed by cooling to 10° C. using a plate cooler to obtain cold wort.

Beer yeast was added to this wort and ferment it at around 10° C. for 7 days, after which the beer yeast was removed. The tank was changed, the resulting wort was matured for 7 days, then cooled to around −1° C. and stabilized for 14 days. After dilution by adding gas-removed water, filtration was conducted using diatomaceous earth to obtain a wort fermented liquid.

Next, the obtained wort fermented liquid was sprayed into a gas-removing tank under a reduced pressure of about 90 mbar to remove carbon dioxide gas, followed by heating to about 50° C. using a plate cooler. Thereafter, it was brought into contact with water vapor heated to around 50° C. in a column at a reduced pressure of around 90 mbar to adsorb volatile components to the water vapor so that alcohol and volatile components are removed, thereby obtaining an alcohol-removed wort fermented liquid having an alcohol concentration of 0.02% (v/v).

The obtained alcohol-removed wort fermented liquid was diluted by adding gas-removed water so that the genuine extract concentration was 5.0%, carbon dioxide gas was dissolved so as to be 2.9 gas volumes, and pH adjustment was conducted with phosphoric acid so that the pH was 3.9, thereby obtaining a beer-taste fermented malt beverage. This was represented as sample 1-1. On the other hand, predetermined amounts of gas-removed water, pyruvic acid and succinic acid were added to the alcohol-removed wort fermented liquid, carbon dioxide gas was dissolved so as to be 2.9 gas volumes, and further pH adjustment was conducted with phosphoric acid so that the pH was 3.9, thereby preparing beer-taste fermented malt beverages of samples 1-2 to 1-11.

Regarding these samples, the genuine extract component (% (w/w)) of the beer-taste fermented malt beverage was measured by using the EBC method. Furthermore, the pH and bitterness value were measured.

The concentrations of pyruvic acid and succinic acid in the beer-taste fermented malt beverage were measured by the following method. First, a decarbonated beer-taste fermented malt beverage was appropriately diluted with distilled water, filtered through a filter, and subjected to UHPLC analysis. The measurement conditions for UHPLC were as follows.

TABLE 1

| | |
|---|---|
| Measurement Instrument | UHPLC (Shimadzu Corporation, Nexera) - MS/MS (AB Sciex, API 3200) |
| Column | Hypercarb, 2.1 × 150 mm, 3 μm (Thermo Scientific) |
| Column Temperature | 80° C. (Tmax = 85° C.) |
| Mobile Phase | Liquid A: 10 mmol/L ammonium acetate/0.1% acetic acid aqueous solution Liquid B: methanol |
| Flow Rate | 0.2 mL/min |
| Gradient Conditions | 0 min . . . 0% B, 25 min . . . 3% B, 40 min . . . 18% B, 50 min 25% B, 65 min . . . 80% B, 75 min . . . 80% B, 75.1 min . . . 0% B, 90 min . . . 0% B |
| Ionization Conditions | ESI positive, CUR 20, CAD 3, IS 5500, TEM 300, GS1 70, GS2 60, ihe ON |
| Sample Amount | 10 μL |

[Sensory Evaluation Method]

Sensory evaluation was performed on the prepared samples. The five evaluation items of "having fermented feeling", "feeling robust feeling of drinking", "not feeling wateriness", "having refreshing feeling", and "not feeling prominent sourness" were set, and 10 trained panelists specialized in beer scored according to the criteria described below. The average score of all the panelists was used as the score for each evaluation item. The liquid temperature of the samples used for evaluation was around 4° C.

[Evaluation Items and Evaluation Criteria]

Having Fermented Feeling:

The fermented feeling was defined as a beer-like complex taste. "Asahi Super Dry" (trade name) manufactured by Asahi Breweries, Ltd. was given 5 points, and water was given 1 point, scored on a 5-levels scale.

Not Feeling Wateriness:

The wateriness was defined as a weak taste that feels much in water content. "Asahi Super Dry" (trade name) manufactured by Asahi Breweries, Ltd. was given 5 points, and water was given 1 point, scored on a 5-levels scale.

Feeling Robust Feeling of Drinking:

The robust feeling of drinking was defined as a feeling of touchiness or catchiness felt in the throat when swallowing. "Asahi Super Dry" (trade name) manufactured by Asahi Breweries, Ltd. was given 5 points, and water was given 1 point, scored on a 5-levels scale.

Having Refreshing Feeling:

The refreshing feeling was defined as not feeling a sticky aftertaste. "Asahi Super Dry" (trade name) manufactured by Asahi Breweries, Ltd. was given 5 points, a 2.0% (w/w) aqueous solution of dextrin was given 1 point, scored on a 5-levels scale.

Not Feeling Prominent Sourness:

The prominent sourness was defined as feeling sourness clearly. "Asahi Super Dry" (trade name) manufactured by Asahi Breweries, Ltd. was given 5 points, and a 200 ppm citric acid aqueous solution was given 1 point, scored on a 5-levels scale.

Palatability: "A fermented feeling", "feeling a robust feeling of drinking", "having a refreshing feeling", "not feeling Wateriness" and "not feeling prominent sourness", all of which were scored 3.5 or higher, were rated as good "A", and the others were rated as poor "X".

TABLE 2

| | Item | Sample 1-1 | Sample 1-2 | Sample 1-3 | Sample 1-4 | Sample 1-5 | Sample 1-6 |
|---|---|---|---|---|---|---|---|
| Analytical value and the like | Genuine extract concentration (%) | 5.0 | 5.0 | 5.0 | 5.0 | 5.0 | 5.0 |
| | Pyruvic acid concentration (ppm) | 24.7 | 50.0 | 70.0 | 80.0 | 24.7 | 24.7 |
| | Succinic acid concentration (ppm) | 40.5 | 40.5 | 40.5 | 40.5 | 60.0 | 80.0 |
| | pH | 3.9 | 3.9 | 3.9 | 3.9 | 3.9 | 3.9 |
| | Bitterness value (BU) | 20 | 20 | 20 | 20 | 20 | 20 |
| Sensory evaluation | Having a fermented feeling | 4.2 | 4.4 | 4.5 | 4.5 | 4.2 | 4.4 |
| | Feeling a robust feeling of drinking | 4.0 | 4.2 | 4.2 | 4.5 | 4.2 | 4.4 |
| | Having a refreshing feeling | 3.8 | 4.0 | 4.2 | 4.0 | 3.8 | 3.6 |
| | Not feeling wateriness | 3.8 | 4.2 | 4.4 | 4.4 | 4.0 | 4.2 |
| | Not feeling prominent acidity | 3.5 | 3.8 | 3.6 | 2.8 | 3.8 | 3.8 |
| | Palatability | A | A | A | X | A | A |

TABLE 3

| | Item | Sample 1-7 | Sample 1-8 | Sample 1-9 | Sample 1-10 | Sample 1-11 |
|---|---|---|---|---|---|---|
| Analytical value and the like | Real extract concentration (%) | 5.0 | 5.0 | 5.0 | 5.0 | 5.0 |
| | Pyruvic acid concentration (ppm) | 50.0 | 70.0 | 80.0 | 24.7 | 70.0 |
| | Succinic acid concentration (ppm) | 80.0 | 80.0 | 80.0 | 90.0 | 90.0 |
| | pH | 3.9 | 3.9 | 3.9 | 3.9 | 3.9 |
| | Bitterness value (BU) | 20 | 20 | 20 | 20 | 20 |
| Sensory evaluation | Having a fermented feeling | 4.4 | 4.5 | 4.5 | 3.8 | 4.6 |
| | Feeling a robust feeling of drinking | 4.4 | 4.4 | 4.2 | 4.4 | 4.4 |
| | Having a refreshing feeling | 3.8 | 3.6 | 3.6 | 3.2 | 3.3 |

TABLE 3-continued

| | Item | Sample 1-7 | Sample 1-8 | Sample 1-9 | Sample 1-10 | Sample 1-11 |
|---|---|---|---|---|---|---|
| | Not feeling wateriness | 4.4 | 4.6 | 4.6 | 4.0 | 4 |
| | Not feeling prominent acidity | 3.8 | 3.5 | 2.9 | 4.0 | 3.8 |
| | Palatability | A | A | X | X | X |

Example 2

Crushed malt, an enzyme and warm water were put in a preparation tank, protein was decomposed at around 55° C., and then saccharifying was performed at a temperature in the range of 60° C. to 76° C. This saccharified liquid was filtered with a lauter that was a filter tank, then transferred to a boiling kettle, bitter hops were added, and boiled for 60 minutes. After boiling, warm water equivalent to the evaporated component was added, hot trub was removed in a whirlpool tank, followed by cooling to 10° C. using a plate cooler to obtain cold wort.

Beer yeast was added to this wort to ferment it at around 10° C. for 7 days, after which the beer yeast was removed. The tank was changed, the resulting wort was matured for 7 days, then cooled to around −1° C. and stabilized for 14 days. Then, after dilution by adding gas-removed water, filtration was conducted using diatomaceous earth to obtain a wort fermented liquid.

Next, the obtained wort fermented liquid was sprayed into a gas-removed tank under a reduced pressure of about 90 mbar to remove carbon dioxide gas, followed by heating to about 50° C. using a plate cooler. Thereafter, it was brought into contact with water vapor heated to around 50° C. in a column at a reduced pressure of around 90 mbar to adsorb volatile components to the water vapor so that alcohol and volatile components are removed, thereby obtaining an alcohol-removed wort fermented liquid having an alcohol concentration of 0.02% (v/v).

The obtained alcohol-removed wort fermented liquid was diluted by adding gas-removed water so that the genuine extract component was 5.0% (w/w), carbon dioxide gas was dissolved so as to be 2.9 gas volumes, and pH adjustment was conducted with phosphoric acid so that the pH was 3.9, thereby obtaining a beer-taste fermented malt beverage. This was represented as sample 2-1. On the other hand, predetermined amounts of gas-removed water, pyruvic acid and succinic acid were added to the alcohol-removed wort fermented liquid, carbon dioxide gas was dissolved so as to be 2.9 gas volumes, and further pH adjustment was conducted with phosphoric acid so that the pH was 3.9, thereby preparing beer-taste fermented malt beverages of samples 2-2 to 2-4.

Regarding these samples, the genuine extract concentration, pyruvic acid concentration, succinic acid concentration, pH and bitterness value were measured in the same manner as in Example 1, and sensory evaluation was performed.

TABLE 4

| Item | | Sample 2-1 | Sample 2-2 | Sample 2-3 | Sample 2-4 |
|---|---|---|---|---|---|
| Analytical value and the like | Genuine extract concentration (%) | 5.0 | 5.0 | 5.0 | 5.0 |
| | Pyruvic acid concentration (ppm) | 5.3 | 5.3 | 25.0 | 25.0 |
| | Succinic acid concentration (ppm) | 45.9 | 80.0 | 45.9 | 80.0 |
| | pH | 3.9 | 3.9 | 3.9 | 3.9 |
| | Bitterness value (BU) | 20 | 20 | 20 | 20 |
| Sensory evaluation | Having a fermented feeling | 3.0 | 3.2 | 4.1 | 3.8 |
| | Feeling a robust feeling of drinking | 3.8 | 4.0 | 4.0 | 4.2 |
| | Having a refreshing feeling | 3.2 | 2.8 | 3.8 | 3.6 |
| | Not feeling wateriness | 3.2 | 3.8 | 3.8 | 4.2 |
| | Not feeling prominent acidity | 3.5 | 4.0 | 3.6 | 3.8 |
| | Palatability | X | X | A | A |

Example 3

The alcohol-removed wort fermented liquid obtained in Example 1 was diluted by adding a predetermined amount of gas-removed water so that the succinic acid concentration was 30 ppm. An isomerized hop extract was added so that the bitterness value was 20 BU. Then, predetermined amounts of dextrin and pyruvic acid were added so that the genuine extract concentration was 5.0% and the pyruvic acid concentration was 40 ppm. Further, carbon dioxide gas was dissolved so as to be 2.9 gas volumes, and pH adjustment was conducted with phosphoric acid so that the pH was 3.9, thereby obtaining a beer-taste fermented malt beverage. This was represented as sample 3-1. On the other hand, predetermined amounts of gas-removed water, pyruvic acid and succinic acid were added to the alcohol-removed wort fermented liquid, carbon dioxide gas was dissolved so as to be 2.9 gas volumes, and further pH adjustment was conducted with phosphoric acid so that the pH was 3.9, thereby preparing beer-taste fermented malt beverages of samples 3-2 to 3-4.

Regarding these samples, the genuine extract concentration, pyruvic acid concentration, succinic acid concentration, pH and bitterness value were measured in the same manner as in Example 1, and sensory evaluation was performed.

TABLE 5

| Item | | Sample 3-1 | Sample 3-2 | Sample 3-3 | Sample 3-4 |
|---|---|---|---|---|---|
| Analytical value and the like | Genuine extract concentration (%) | 5.0 | 5.0 | 5.0 | 5.0 |
| | Pyruvic acid concentration (ppm) | 40.5 | 70.0 | 40.5 | 70.0 |

TABLE 5-continued

| Item | | Sample 3-1 | Sample 3-2 | Sample 3-3 | Sample 3-4 |
|---|---|---|---|---|---|
| | Succinic acid concentration (ppm) | 29.2 | 29.2 | 40.0 | 40.0 |
| | pH | 3.9 | 3.9 | 3.9 | 3.9 |
| | Bitterness value (BU) | 20 | 20 | 20 | 20 |
| Sensory evaluation | Having a fermented feeling | 4.0 | 4.2 | 4.2 | 4.5 |
| | Feeling a robust feeling of drinking | 3.4 | 3.4 | 4.2 | 4.2 |
| | Having a refreshing feeling | 3.8 | 3.8 | 3.8 | 4.2 |
| | Not feeling wateriness | 3.0 | 3.6 | 3.8 | 4.4 |
| | Not feeling prominent acidity | 3.0 | 2.8 | 3.5 | 3.6 |
| | Palatability | X | X | A | A |

Figure 1:
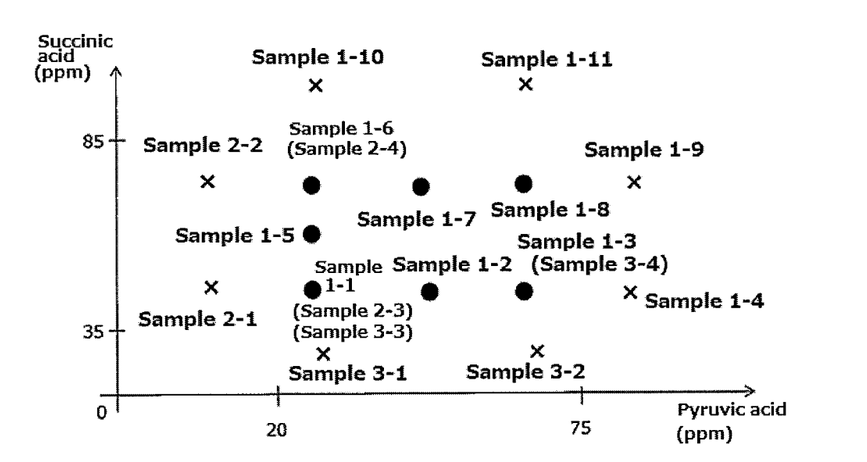
FIG. 1 is a graph showing relationship between the concentrations of pyruvic acid and succinic acid and the palatability of low-alcohol beer-taste fermented malt beverages.

FIG. 1 is a graph showing the relationship between the concentrations of pyruvic acid and succinic acid and the palatability of low-alcohol beer-taste fermented malt beverages by summarizing the results of Examples 1 to 3. In the figure, the symbol "●" indicates that the palatability of the sample was good, and the symbol "X" indicates that the palatability of the sample was poor. From the relationship shown in FIG. 1, it is understood that the palatability of the low-alcohol beer-taste fermented malt beverage is improved by adding pyruvic acid and succinic acid in predetermined concentration ranges.

Example 4

The alcohol-removed wort fermented liquid obtained in Example 1 was diluted by adding a predetermined amount of water so that the genuine extract concentration was 4.0%, 3.5%, 3.0%, 2.5% or 2.0%, and the bitterness value was adjusted using an isomerized hop extract so that the bitterness value was 20 BU. Thereafter, carbon dioxide gas was dissolved so as to be 2.9 gas volumes, and further pH adjustment was conducted with phosphoric acid so that the pH was 3.9, thereby obtaining five beer-taste fermented malt beverages. These were represented as samples 4-1, 4-2, 4-3, 4-4, and 4-5.

Regarding these samples, the genuine extract concentration, pyruvic acid concentration, succinic acid concentration, pH and bitterness value were measured in the same manner as in Example 1, and sensory evaluation was performed.

TABLE 6

| Item | | Sample 4-1 | Sample 4-2 | Sample 4-3 | Sample 4-4 | Sample 4-5 |
|---|---|---|---|---|---|---|
| Analytical value and the like | Genuine extract concentration (%) | 4.0 | 3.5 | 3.0 | 2.5 | 2.0 |
| | Pyruvic acid concentration (ppm) | 42.7 | 43.0 | 43.0 | 43.0 | 43.0 |

TABLE 6-continued

| Item | | Sample 4-1 | Sample 4-2 | Sample 4-3 | Sample 4-4 | Sample 4-5 |
|---|---|---|---|---|---|---|
| | Succinic acid concentration (ppm) | 47.0 | 47.0 | 47.0 | 47.0 | 47.0 |
| | pH | 3.9 | 3.9 | 3.9 | 3.9 | 3.9 |
| | Bitterness value (BU) | 20 | 20 | 20 | 20 | 20 |
| Sensory evaluation | Having a fermented feeling | 4.0 | 3.8 | 3.6 | 3.5 | 3.0 |
| | Feeling a robust feeling of drinking | 4.4 | 4.2 | 4.0 | 3.8 | 3.4 |
| | Having a refreshing feeling | 4.2 | 4.0 | 3.6 | 3.6 | 3.2 |
| | Not feeling wateriness | 4.2 | 4.2 | 3.5 | 3.5 | 2.5 |
| | Not feeling prominent acidity | 3.8 | 3.6 | 3.6 | 3.6 | 2.5 |
| | Palatability | A | A | A | A | X |

TABLE 7

| Item | | Sample 5-1 | Sample 5-2 |
|---|---|---|---|
| Analytical value and the like | Genuine extract concentration (%) | 2.0 | 4.0 |
| | Pyruvic acid concentration (ppm) | 0 | 0 |
| | Succinic acid concentration (ppm) | 0 | 0 |
| | pH | 3.9 | 3.9 |
| | Bitterness value (BU) | 20 | 20 |
| Sensory evaluation | Having a fermented feeling | 2.0 | 2.0 |
| | Feeling a robust feeling of drinking | 3.0 | 3.2 |
| | Having a refreshing feeling | 2.0 | 2.0 |
| | Not feeling wateriness | 3.5 | 3.6 |
| | Not feeling prominent acidity | 2.0 | 1.6 |
| | Palatability | X | X |

Reference Example

A non-fermented non-alcohol beer-taste beverage was prepared and sensory evaluation was performed.

One kilogram of malt was crushed to an appropriate particle size and put in a preparation tank, 3 L of warm water was added thereto, the temperature was maintained at 65° C. for 30 minutes, the temperature was then gradually raised, and saccharifying was performed at 75° C. for 30 minutes. After completion of the saccharifying, the temperature was raised to 78° C., and filtration was performed using a filter paper to obtain a filtrate. The production scale was set to 1 L, hops were added, and boiled at 100° C. for 60 minutes. The liquid after boiling was filtered using a filter paper and cooled to about 2° C. Water was added to adjust the wort as appropriate so that the genuine extract concentration was 2.0%. A beer flavored flavoring and a caramel coloring were added to this wort, and an isomerized hop extract was added to adjust the bitterness value. After pH adjustment with phosphoric acid was conducted on the liquid after dilution so that the pH was 3.9, carbon dioxide gas was dissolved so as to be 2.9 gas volumes, thereby preparing Sample 5-1. On the other hand, water was added to the obtained wort so that the genuine extract concentration was 4.0% to adjust the wort. A beer flavored flavoring and a caramel coloring were added to this wort, and an isomerized hop extract component was added to adjust the bitterness value. After pH adjustment with phosphoric acid was conducted on the liquid after dilution so that the pH was 3.9, carbon dioxide gas was dissolved so as to be 2.9 gas volumes, thereby preparing Sample 5-2.

For these samples, the genuine extract concentration, pyruvic acid concentration, succinic acid concentration, pH and bitterness value were measured in the same manner as in Example 1, and sensory evaluation was performed.

The invention claimed is:

1. A beer-taste fermented malt beverage with an alcohol concentration of less than 1% (v/v), comprising:
   an alcohol-removed wort fermented liquid with an alcohol concentration of less than 1% (v/v),
   20 to 75 ppm of pyruvic acid,
   35 to 85 ppm of succinic acid, and
   having a genuine extract concentration of more than 2.5% (w/w).

2. The beer-taste fermented malt beverage according to claim 1, further comprising a pH adjusting agent and having a pH of less than 4.2.

3. The beer-taste fermented malt beverage according to claim 2, wherein the pH adjusting agent is at least one selected from the group consisting of phytic acid, lactic acid, lactic acid bacteria, phosphoric acid, malic acid, sulfurous anhydride and tartaric acid.

4. The beer-taste fermented malt beverage according to claim 1, having a bitterness value of 5 to 100 BU.

5. The beer-taste fermented malt beverage according to claim 1, wherein the alcohol-removed wort fermented liquid comprises a wort fermented liquid having an apparent final degree of fermentation of 45 to 80%.

6. The beer-taste fermented malt beverage according to claim 1, having a malt use ratio of 25% or more.

7. The beer-taste fermented malt beverage of claim 1, wherein the alcohol removed wort fermented liquid has an alcohol concentration from 0.02 to 0.1% (v/v).

8. A method for producing a beer-taste fermented malt beverage with an alcohol concentration of less than 1% (v/v), comprising an alcohol-removed wort fermented liquid with an alcohol concentration of less than 1% (v/v), 20 to 75 ppm of pyruvic acid, 35 to 85 ppm of succinic acid, and having a genuine extract concentration of more than 2.5% (w/w), the method comprising:

a step of obtaining a wort fermented liquid; and a step of reducing the alcohol concentration in the wort fermented liquid to less than 1% (v/v) by removing alcohol from the wort fermented liquid through vacuum distillation.

9. The method of claim 8, wherein the step of reducing the alcohol concentration reduces the alcohol concentration to from 0.02 to 0.1% (v/v).

10. The method of claim 8, wherein the wort fermented liquid has an apparent final degree of fermentation of 45 to 80%.

11. A method for reducing a watery drinking feeling of a beer-taste fermented malt beverage with an alcohol concentration of less than 1% (v/v) and comprising an alcohol-removed wort fermented liquid, the method comprising:

adjusting a pyruvic acid concentration of the beverage to 20 to 75 ppm;

adjusting a succinic acid concentration of the beverage to 35 to 85 ppm;

adjusting a genuine extract concentration of the beverage to more than 2.5% (w/w); and adjusting the alcohol concentration of the beverage to less than 1% (v/v).

12. The method of claim 11, wherein the step of adjusting the alcohol concentration adjusts the alcohol concentration to from 0.02 to 0.1% (v/v).

13. The method of claim 11, wherein the alcohol-removed wort fermented liquid comprises a wort fermented liquid having an apparent final degree of fermentation of 45 to 80%.

* * * * *